United States Patent [19]
Norais et al.

[11] Patent Number: 6,110,388
[45] Date of Patent: Aug. 29, 2000

[54] SLUDGE FILTRATION DEVICE COMPRISING A FILTER PISTON, AND SLUDGE TREATMENT PLANT AND SLUDGE FILTRATION PROCESS THEREOF

[75] Inventors: Marcel Norais, Uzel; Bernard Neveu, Puteaux, both of France

[73] Assignee: Elf Atochem S.A., France

[21] Appl. No.: 08/957,747

[22] Filed: Oct. 24, 1997

[30] Foreign Application Priority Data

Oct. 25, 1996 [FR] France ..................... 96 13029

[51] Int. Cl.$^7$ ............... B01D 33/01; B30B 9/04
[52] U.S. Cl. ............ 210/770; 210/780; 210/791; 210/397; 210/406; 210/408; 210/416.1; 100/37; 100/112; 100/116; 100/215
[58] Field of Search ................... 100/110, 112, 100/116, 37, 215; 210/391, 406, 407, 408, 413, 416.1, 770, 768, 780, 791, 397

[56] References Cited

U.S. PATENT DOCUMENTS

| | | | |
|---|---|---|---|
| 4,249,400 | 2/1981 | Arendt | 100/116 |
| 4,343,233 | 8/1982 | Burgin | 100/116 |
| 4,346,653 | 8/1982 | Rodak | 100/116 |
| 4,347,137 | 8/1982 | Dick, Jr. . | |
| 4,676,079 | 6/1987 | Czauderna | 100/116 |
| 4,995,972 | 2/1991 | Kramer et al. . | |
| 5,366,626 | 11/1994 | Pierson | 210/216 |

FOREIGN PATENT DOCUMENTS

| | | |
|---|---|---|
| 0 260 249 A1 | 3/1988 | European Pat. Off. . |
| 0 674 930 A1 | 10/1995 | European Pat. Off. . |
| 55-024789 | 2/1980 | Japan . |

*Primary Examiner*—Robert J. Popovics
*Attorney, Agent, or Firm*—Pennie & Edmonds LLP

[57] ABSTRACT

The sludge filtration device comprises: a filter (1) placed over an approximately horizontal box (4), this filter (1) constituting, in its filtration position, the bottom of a filter chamber (8) of essentially vertical axis; a piston (10) suitable for closing the filter chamber in the top part; means (3, 11) for causing relative movement between the box (4) provided with the filter (1) and the piston (10) so that a liquid filtrate flows downwards through the filter (1) and so that a cake of solid matter remains on the filter (1) at the end of the operation; and a scraper device (31) provided for removing this cake. The piston is made in the form of a filter piston (10) so that a liquid effluent passes through the filter piston (10) as the volume of the filter chamber (8) is being decreased, and a suction pumping means (P) is provided for removing the effluent above the filter piston (10).

15 Claims, 3 Drawing Sheets

SLUDGE FILTRATION DEVICE COMPRISING A FILTER PISTON, AND SLUDGE TREATMENT PLANT AND SLUDGE FILTRATION PROCESS THEREOF

The invention relates to a sludge filtration device of the kind of those comprising:

- a filter placed over an approximately horizontal box which can be moved from a filtering position to a cleaning position and vice versa, this filter constituting, in its filtering position, the bottom of a filter chamber of essentially vertical axis,
- a piston suitable for closing the filter chamber at the top part,
- means for causing relative movement between the box provided with the filter and the piston in order, as the piston and box are being moved closer together, for pressure to be exerted on a volume of sludge introduced into the filter chamber, so that a liquid filtrate flows downwards through the filter and so that a cake of solid matter remains on the filter at the end of the operation,
- and a scraper device provided for removing this cake when the filter is placed in its cleaning position.

The term "sludge" used in the description and the claims is meant in a very general sense to denote any suspension of relatively fine inorganic and/or organic solid matter in a liquid, one particular example of sludge being liquid manure.

A filtration device of this kind is known, in particular, from EP-A-0,674,930. Such a device is relatively satisfactory and enables sludge to be treated effectively. The horizontal arrangement of the filter leads to gravity acting uniformly over the entire surface of the filter and to a well-distributed flow of the filtrate downwards. The cake of solid matter is supported uniformly by the horizontal filter and its ejection is controlled entirely by the scraper.

However, it is desirable to reduce the time for treating a given volume of sludge and thus to improve the productivity of the device, without having to increase the pressure in the filter chamber appreciably.

It is also desirable for the device still to have an acceptable cost and to be of a simple and robust construction.

According to the invention, a filtration device of the kind defined above is characterized in that the piston is made in the form of a filter piston so that a liquid effluent passes through the filter piston as the volume of the filter chamber is being decreased and in that a suction pumping means is provided for removing the effluent above the piston.

The filtration surface thus increased, virtually doubled, makes it possible to treat a given volume of sludge more rapidly and therefore reduce the duration of a cycle. The filtration pressure in the chamber may be decreased, thereby enabling savings of material to be made with regard to the structural components of the device since they are subjected to lower stresses.

Preferably, the suction pumping means comprises a vacuum pump. Advantageously, the pressure established by this vacuum pump on the opposite side of the filter piston from the filter chamber is, in absolute pressure value, from approximately 400 to 500 millibars.

The vacuum pump may be combined with a tank in which the effluent sucked up through the filter piston is collected.

Advantageously, the filter piston includes, on the opposite side from the filter chamber, a closed volume suitable for gathering the effluent which has passed through the filter of the filter piston, this closed volume being connected to the suction pumping means.

The filter piston preferably consists of a hollow cylinder, open on the side turned towards the filter chamber and provided at its opposite end with a bottom, the open end of the hollow cylinder being equipped with a support screen under which the filter proper, in particular a filter cloth, is fixed. The closed volume lies above the screen and is provided, in the top part, with at least one passage connected to the suction pumping means.

The meshes of the filter provided on the filter piston preferably have a nominal diameter greater than that of the meshes of the lower filter.

Advantageously, the scraper is equipped with brushing means in the bottom part and in the top part, and the device is provided so that, in the cleaning position, the scraper acts simultaneously against the lower filter and the upper filter.

The invention also relates to a sludge treatment plant, in particular for liquid manure, comprising at least one filtration device as defined above.

The invention also relates to a sludge filtration process using a device as defined above, this process being characterized in that the suction pumping means, in particular the vacuum pump, combined with the upper filter piston, continues to operate, whatever the position of the piston, during the filtration operations.

The invention consists, apart from the arrangements mentioned hereinabove, of a certain number of other arrangements which will be explained in more detail below with regard to illustrative embodiments which are described with reference to the appended drawings but which are in no way limiting.

Of these drawings, FIG. 1 is a diagrammatic view, in vertical cross-section, of a filtration device according to the invention with the filter piston in the high position and the lower filter in the low position, the filter chamber being empty.

Figure 7:
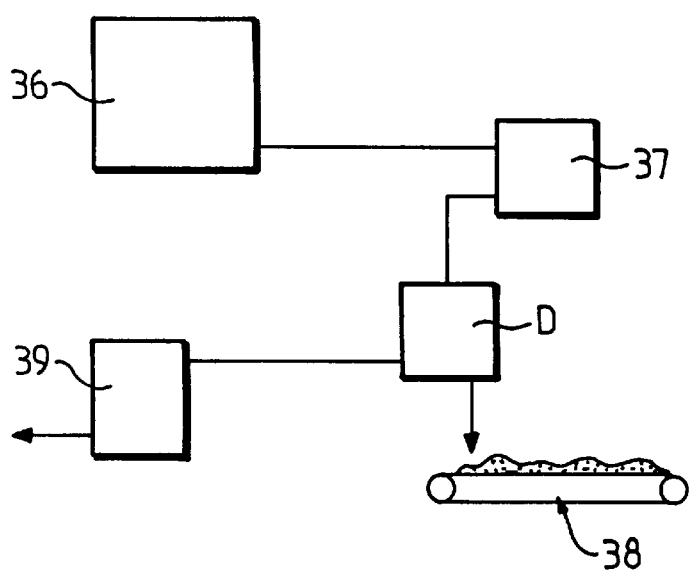

Finally, FIG. 7 is a diagram of a plant incorporating the filtration device.

In the description which follows, the components other than the upper filter piston and its appendages are similar to components described in EP-A-0,674,930 to which reference may be made for further details. The components in question will only be briefly described below.

Figure 1:
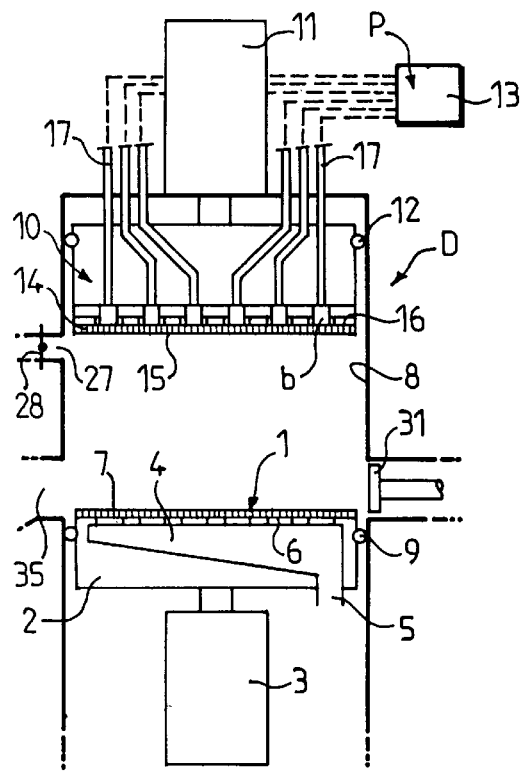
Figure 2:
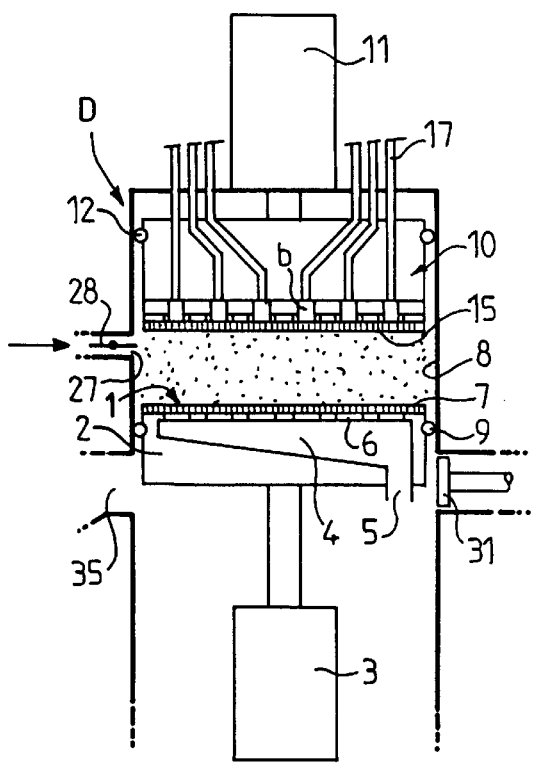
FIG. 2 is a diagram, similar to FIG. 1, showing the device in a configuration in which the filter chamber is being filled with sludge.
Figure 3:
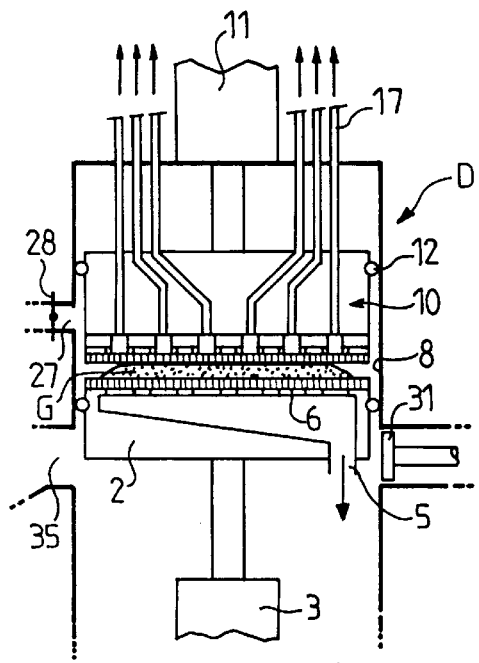
FIG. 3 is a diagram, similar to that in FIG. 1, of the device in a configuration corresponding to completed filtration.
Figure 4:
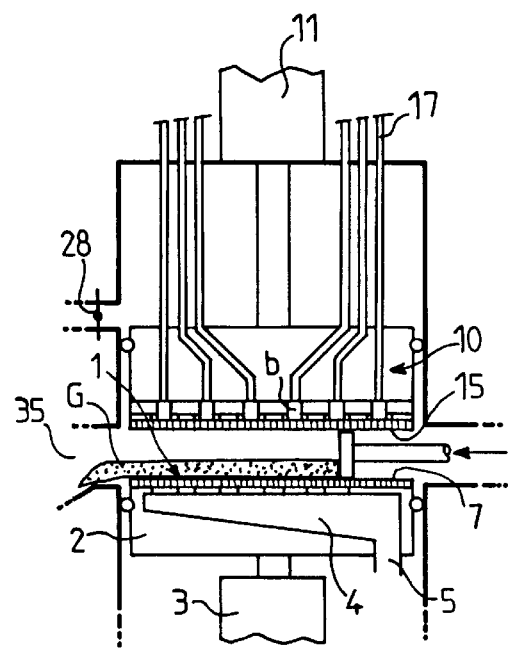
FIG. 4 is a diagram, similar to that in FIG. 1, of the device in a configuration corresponding to the removal of the filter cake and to the cleaning of the filtering surfaces.

Referring to the drawings, in particular to FIGS. 1 to 5, a sludge filtration device D may be seen which comprises a filter 1, arranged approximately horizontally, suitable for being moved from a high position for filtering, shown in FIGS. 2 and 3, to a low position for cleaning, shown in FIGS. 1 and 4, and vice versa. The filter 1 is placed on a box 2 fixed to the upper end of the rod of a ram 3 of vertical axis, suitable for causing the box 2 and the filter 1 to move in vertical translation. The box 2 has a cavity 4 extending over the entire filtration surface, the bottom of which cavity, together with the outlet 5, forms a funnel. A screen 6, or perforated plate, having passage holes of relatively large diameter, for example of about five millimetres, is placed horizontally above the upper opening of the cavity 4. This screen 6 serves as a support for a filtration means proper which consists, preferably, of a filter cloth 7 removably fixed to the screen 6.

In its filtering position (FIGS. 2 and 3), the filter 1, formed by the combination of the screen 6 and the cloth 7, constitutes the bottom of a filter chamber 8 of essentially vertical axis. Peripheral sealing is provided between the box 2 and the internal surface of the chamber 8 by a seal 9.

The filtration device D furthermore comprises a piston 10 suitable for closing the filter chamber 8 in the top part. This piston 10 is fixed to the lower end of the rod of a ram 11 coaxial with the ram 3 and suitable for making the piston 10 slide in the chamber 8. A peripheral seal 12 is provided between the side wall of the piston 10 and the wall of the chamber 8.

According to the invention, the piston 10 is made in the form of a filter piston and a suction pumping means P is provided for removing the effluent, or filtrate, which passes upwards through the filter piston 10 while a volume of sludge is being compressed in the chamber 8.

The suction pumping means P advantageously consists of a vacuum pump 13 (FIG. 5) suitable for creating a partial vacuum above the lower filtering surface of the filter piston 10. A tank C is interposed in series between the filter piston 10 and the pump 13 in order to collect the filtrate. Preferably, the vacuum pump 13 is suitable for creating an absolute pressure of approximately 400 to 500 millibars behind the filtering surface of the filter piston 10, i.e. a pressure markedly less than atmospheric pressure.

The filter piston 10, in its lower part, includes a horizontal support screen 14 or perforated plate which extends virtually over the entire cross-section of the piston. The filtration means proper consists of a filter cloth 15 removably fixed under the screen 14 and against the latter, over its entire surface. A closed volume 16 is provided in the piston 10 above the screen 14 in order to collect the filtrate which has passed through the cloth 15. This closed volume 16 is connected, for example by nozzles b and hoses 17, to the vacuum pump 13. Preferably, the nozzles b are distributed more or less uniformly above the screen 14.

Figure 6:
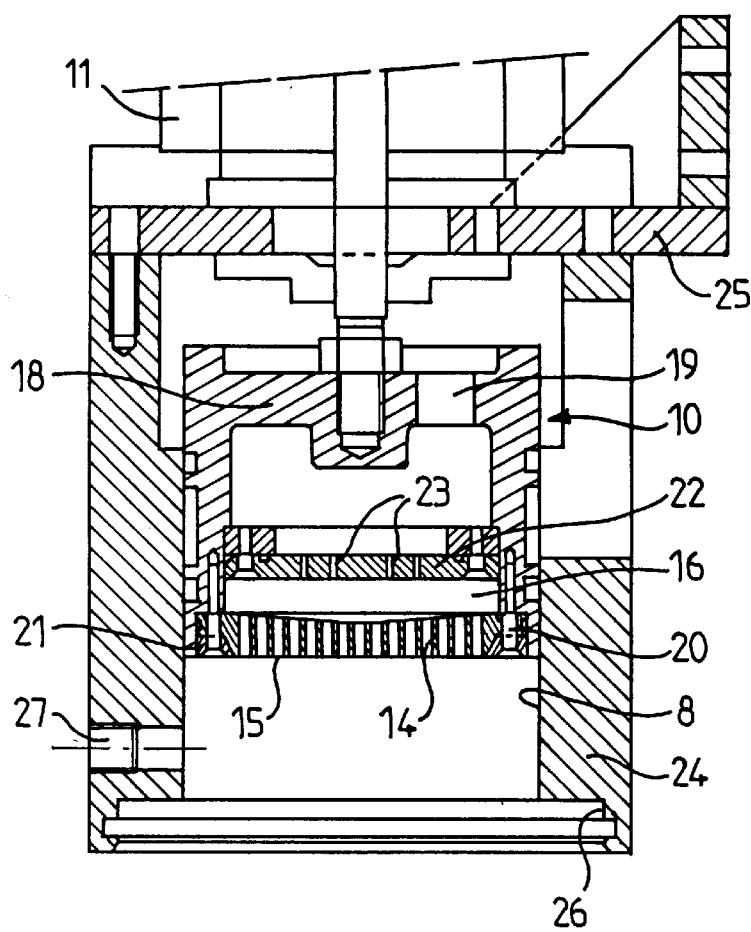
FIG. 6 is a vertical axial cross-section, on a larger scale, of a filter piston according to the invention and of its cylindrical shell delimiting the filter chamber.

As illustrated in FIG. 6, the filter piston 10 may be formed by a hollow cylinder of revolution, closed in the top part by a transverse wall 18 through which an orifice 19 passes. The open lower end of the piston 10 is equipped with the screen 14, removably fixed by screws 20 which engage in tapped holes provided in the cylindrical wall of the piston 10. These screws 20 also make it possible to press a clamping ring 21 against an undercut of corresponding shape provided around the periphery of the screen 14. The filter cloth 15, stretched tight beneath the screen 14, is fixed around its periphery by clamping between the ring 21 and the edge of the screen 14.

The volume 16 is closed in the top part by a removable horizontal plate 22 through which passages 23, enabling the filtrate to be sucked out, pass.

Figure 5:
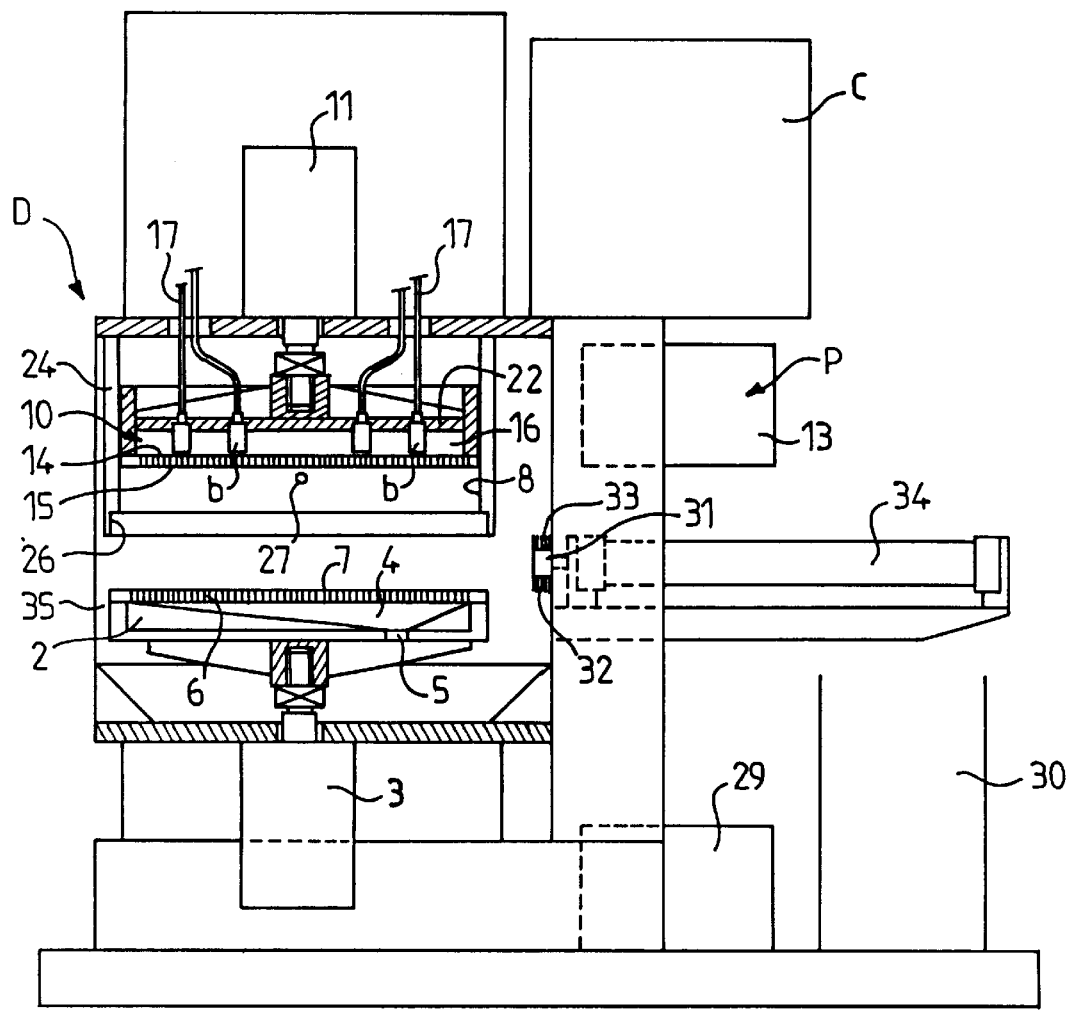
FIG. 5 is a diagrammatic view, in more detail, in elevation with cut-away parts of the entire filtration device.

The suction nozzles b may be fitted directly onto the plate 22, as diagrammatically illustrated in FIG. 5. According to another possibility, the connection to the suction hose is made at the orifice 19 according to FIG. 6, and the passages 23 are not equipped with suction nozzles.

As may be clearly seen in FIG. 6, the chamber 8 is delimited by a cylindrical shell 24 in which the filter piston 10 can slide in a sealed manner. This shell 24 is fixed at its upper end under a bracket 25 which itself will be fixed to the frame of the filtration device D. The lower end of the shell 24 has a cylindrical housing 26 of larger diameter, suitable for receiving, in the filtering position, the upper part of the filter 1 which then closes the chamber 8 in a sealed manner. A radial passage 27 is provided in the shell 24 in order to make the chamber 8, when it is closed in the bottom part by the filter 1, communicate with a pipe for inlet of the sludge to be filtered. This inlet pipe is equipped with an inlet valve 28 shown diagrammatically in FIG. 1. The sludge is let into the passage 27 by a delivery pump 29 (FIG. 5) from a storage tank 30.

A scraper 31, provided with brushes 32, 33 in the bottom part and top part (FIG. 5), is arranged on the side and is suitable for moving transversely, in the horizontal, in order to clean the filter cloths 7 and 15 simultaneously, after a filtration operation. The movement of the scraper 31 is controlled by a ram 34.

Provided on the opposite side from the scraper 31 is a region 35 for removing the filter cake. The cake can thus fall under gravity onto a conveyor belt such as 38 (FIG. 7) or into a container, not shown.

The meshes of the filter piston 10, at its filter cloth 15, advantageously have a nominal diameter greater than that of the meshes of the cloth 7 of the lower filter 1. It has been found that such an arrangement, while still ensuring effective filtration, makes it possible to delay the clogging of the filter piston 10 and to increase the duration of use of the upper filter cloth 15 before removal.

The nominal diameter of the meshes of the cloth 15 of the filter piston 10 is preferably between 100 and 300 micrometres, while the nominal diameter of the meshes of the lower filter is preferably at most equal to 50 micrometres, especially in the case of filtration of liquid pig manure.

This being the case, the operation of the filtration device is as follows:

Starting from the position illustrated in FIG. 1, in which the lower face of the filter piston 10 is above the inlet 27 while the filter 1 is below the lower opening of the suction chamber 8, the box 2 is raised until the filter 1 closes the lower part of this chamber 8, as illustrated in FIG. 2. The inlet valve 28 is in the closed position.

When the chamber 8 is so formed, closed at the top by the filter piston 10 and at the bottom by the filter 1, the inlet valve 28 is open and the delivery pump 29 (FIG. 5) is switched on in order to fill the volume of the filter chamber 8 with a volume of preflocculated sludge or liquid manure.

When the filling of the chamber 8 has been completed, after an inlet time which is about 5 seconds, the valve 28 is closed.

Next, the filter piston 10 is lowered, the time to lower it possibly being about 15 seconds. The effluent or bottom filtrate passes through the filter 1 and is removed via the orifice 5.

The top effluent, which has passed through the upper filtering surface 15, is sucked up by the vacuum pump 13 through the nozzles b and the hoses 17 FIG. 3) and is collected in the storage tank C. The filter cake G, formed by the solid matter which was in suspension in the sludge, is between the filter 1 and the filter piston 10.

Final wringing is carried out by increasing the pressure in the ram 11 for a time which may be about 5 seconds and during which the cake G is compressed.

Next, the filter 1 and the filter piston 10 are lowered until the filter cloth 7 is at the lower level of the scraper 5. The filter piston 10 is then slightly raised, in order to move away from the filter cake G, as illustrated in FIG. 4, and to leave a passage for the scraper 31.

Next, the scraper 31 is moved from the right to the left, as shown in the drawing, in order to push the cake G towards the discharge point 35, as illustrated in FIG. 4. The spacing between the cloths 7 and 15 is adjusted so that the scraper 31 acts on them simultaneously.

The bottom filter cloth 7 and the top filter cloth 15 are cleaned by the scraper 31 performing several transverse round trips, for example four round trips over a period of approximately 10 seconds.

A complete cycle for filtering a volume is less than one minute.

Approximately ⅓ of the effluent is removed through the filter piston 10 and ⅔ through the filter 1.

The pressure in the filter chamber 8 remains low, about 2 bar, thereby enabling savings on material to be made with regard to the structural components of the device.

Preferably, the vacuum pump 13 continues to operate, whatever the position of the filter piston 10, during a filtration operation, in order to prevent the cake G from being wetted with effluent which might drop off the filter piston.

The tank C collecting the top effluent is emptied and vented to atmosphere after a certain number of cycles, for example 25 cycles.

The solution provided by the invention makes it possible to obtain, with a short cycle time, a filter cake G having a low liquid content.

FIG. 7 diagrammatically illustrates a sludge treatment plant equipped with a device D according to the invention. The sludge, in particular liquid manure, is collected in a pit 36 from which it is drawn off in order to be sent into a vessel 37 for flocculation and, where necessary, for deodorizing. The sludge is extracted from the vessel 37 and sent to the filtration device D. The solid matter of the filter cake is removed, for example onto a conveyor belt 38, and can be converted by composting into organo-mineral fertilizer. The filtrates are sent to a processing plant 39 where they may be subjected to a treatment intended to lower their ammoniacal nitrogen content before being spread on the land.

Treatment plants, in which two or three devices of the prior art had to be mounted in series, can operate with a single filtration device D according to the invention.

The filtration device of the invention can be used for the treatment of any type of sludge, for example liquid pig manure or liquid duck manure, or for the filtration of wine lees, molasses, cutting oils, paint sludge, plankton or sewage-farm sludge, or for the filtration of food products, for example oils, in particular olive oil, fruit juices, etc.

Tests have been carried out with a pilot device on liquid pig manure.

First Test

A first test was carried out with, on the filter piston 10, a filter cloth 15 having a nominal mesh diameter of 300 micrometres and, on the lower filter 1, a filter cloth 7 having a nominal mesh diameter of 50 micrometres. Before filtration, a flocculent was added in the conventional manner to the raw liquid manure as well as a product for reducing the smell.

The top filtrate, the bottom filtrate and the filter cake G were collected separately.

The quantity of raw liquid manure treated was 30 litres and the quantity of flocculent was 4 litres. The results were as follows, the proportions being mass ratios and the abbreviations meaning:

TS=total solids
N—$NH_4^+$=ammoniacal nitrogen
N—NTK=total nitrogen
COD=chemical oxygen demand

|  | TS % | N—$NH_4^+$ % | N-NTK % | $P_2O_5$ % | COD (mg/l) | $K_2O$ % |
|---|---|---|---|---|---|---|
| Raw liquid manure | 8.31 | 0.37 | 0.58 | 0.66 | 76200 | 0.26 |
| Top filtrate | 0.84 | 0.28 | 0.27 | 0.04 | 10200 | 0.23 |
| Bottom filtrate | 0.84 | 0.27 | 0.25 | 0.03 | 9400 | 0.23 |
| Sludge (cake) | 25.56 | 0.47 | 1.00 | 5.54 |  | 0.28 |

The two filtrates obtained have approximately the same composition.

Defining the extraction as the ratio:
(difference between the mass of a component, or the value of a quantity, in the liquid manure and the mass of this component, or the value of this quantity, in the filtrate/mass of the component, or value of the quantity, in the liquid manure), the results of extraction are about:
90% of the solids,
87% of the COD,
94% of the phosphorus,
30% of the nitrogen,
11% of the potassium.

Second Test

This test was carried out on a volume of 50 litres of raw liquid manure and a balance was established. The top and bottom filtrates were combined.

For the following, it will be recalled that the abbreviation:
1 ppm=1 part per million (by mass).

Data:

| amount of raw liquid manure: | 50 liters |
|---|---|
| amount of flocculant: | 5 liters |
| deodorization: | 100 ppm of alkyl ester of undecylenic acid (i.e. 5 g/50 liters 200 ppm of perborate |
| amount of filtrate: | 37 liters |
| amount of sludge (cake): | 18 kg |

Parameters:

| filtration pressure: | 2 bar |
|---|---|
| liquid manure inlet time: | 5 s |
| filtration time: | 25 s |
| filtrate suction time: | 20 s |
| cycle time: | 75 s |

The results are as follows: (mass proportions, with the same meanings of the abbreviations as for the first test):

|  | % TS | % N—($NH_4^+$) | % N-NTK | % $P_2O_5$ | $K_2O$ | COD |
|---|---|---|---|---|---|---|
| Raw liquid manure | 8.03 | 0.37 | 0.67 | 0.44 | 0.26 | 59200 |
| Filtrates | 0.94 | 0.29 | 0.39 | 0.06 | 0.24 | 10800 |
| Sludge (cake) | 20.10 | 0.49 | 1.03 | 1.46 | 0.20 |  |

The results of extraction are about:
90% of the solids,
90% of the phosphorus,

50% of the nitrogen,

30% of the potassium.

Third Test

A third test was carried out in order to study the influence of the mesh size of the cloth 7 of the lower filter 1.

A filtration was performed using a cloth 7 of very fine mesh, having a size of less than or equal to 10 micrometres, i.e. significantly less than 50 micrometres. The results obtained were similar to those obtained using a cloth having a mesh of 50 micrometres. It is therefore not advantageous to go significantly below 50 micrometres for the mesh of the lower cloth since there is no appreciable improvement in the filtration and since, on the other hand, the cloth 7 runs the risk of becoming clogged up more easily.

Finally, the tests have shown that the invention makes it possible, using flocculated liquid pig manure, to obtain the following results of extraction:

80 to 90% of the solids, 80 to 90% of the COD, 80 to 90% of the phosphorus, 40 to 60% of the nitrogen, with a short cycle time, possibly less than 40 seconds.

What is claimed is:

1. Sludge filtration device, comprising:
    a first filter (1) placed over an approximately horizontal box (4) which can be moved from a filtering position to a cleaning position and vice versa, wherein the filtering position is a position where the first filter (1) constitutes a bottom of a filter chamber (8) of essentially vertical axis,
    a piston (10) suitable for closing the filter chamber at a top part,
    means (3, 11) for causing relative movement between the box (4) provided with the first filter (1) and the piston (10) in order, as the piston and box are being moved closer together, for pressure to be exerted on a volume of a sludge introduced into the filter chamber (8), so that a liquid filtrate flows downwards through the first filter (1) and so that a cake (G) of solid matter remains on the first filter (1),
    and a scraper device (31) provided for removing this cake when the first filter (1) is placed in its cleaning position,
    wherein the piston is made in the form of a filter piston (10) so that an effluent passes through the filter piston (10) as the volume of the filter chamber (8) is being decreased and a suction pumping means (P) is provided for removing the effluent above the filter piston (10).

2. Filtration device according to claim 1, wherein the suction pumping means (P) comprises a vacuum pump (13).

3. Filtration device according to claim 2, wherein the pressure established by the vacuum pump on the opposite side of the filter piston (10) from the filter chamber (8) is, in absolute pressure value, from approximately 400 to 500 millibars.

4. Filtration device according to claim 2, wherein the vacuum pump (13) is combined with a tank (C) in which the effluent sucked up through the filter piston (10) is collected.

5. Filtration device according to claim 1, wherein the filter piston (10) includes, on the opposite side from the filter chamber (8), a closed volume (16) suitable for gathering the effluent which has passed through a second filter (15) provided on the filter piston, this closed volume being connected to the suction pumping means (P).

6. Filtration device according to claim 5, wherein the filter piston (10) consists of a hollow cylinder (24), open on the side turned towards the filter chamber (8) and provided at its opposite end with a bottom (18), the open end of the hollow cylinder being equipped with a support screen (14) under which the second filter proper (15) is fixed.

7. Filtration device according to claim 6, wherein the closed volume (16) lies above the screen (14) and is provided with at least one passage (19) connected to the suction pumping means (P).

8. Filtration device according to claim 5, wherein the closed volume is connected to the suction pumping means by nozzles (b) and hoses (17).

9. Filtration device according to claim 6, wherein the second filter proper is a filter cloth.

10. Filtration device according to claim 1, wherein meshes of the second filter (15) provided on the filter piston (10) have a nominal diameter greater than that of meshes of the first filter (1).

11. Filtration device according to claim 10, wherein the meshes of the first filter is from 100 to 300 micrometers, and the meshes of the second filter is at most 50 micrometers.

12. Filtration device according to claim 1, wherein the scraper (31) is equipped with brushing means in a bottom part (32) and in a top part (33) and, in the cleaning position the scraper (31) acts simultaneously against the first filter (1) and the second filter (15).

13. Sludge filtration process using a filtration device according to claim 1 comprising the steps of:
    placing a first filter (1) over an approximately horizontal box (4) to constitute a bottom of a filter chamber (8) of essentially vertical axis;
    operating means (3, 11) to cause relative movement between the box (4) provided with the first filter (1) and a filter piston (10), as the piston and box are being moved closer together, for pressure to be exerted on a volume of a sludge introduced into the filter chamber (8), so that a liquid filtrate flows downwards through the first filter (1), so that an effluent passes through the filter piston (10) and so that a cake (G) of solid matter remains on the first filter (1);
    at the same time, operating a suction pumping means (P) to remove the effluent above the filter piston;
    moving the first filter into a cleaning position; and
    removing the cake from the first filter by a scraper device (31).

14. The sludge filtration process according to claim 13 wherein the suction pumping means (P) is a vacuum pump.

15. Sludge treatment plant for liquid manure, comprising at least one filtration device which comprises:
    a first filter (1) placed over an approximately horizontal box (4) which can be moved from a filtering position to a cleaning position and vice versa, wherein the filtering position is a position where the first filter (1) constitutes a bottom of a filter chamber (8) of essentially vertical axis,
    a piston (10) suitable for closing the filter chamber at a top part,
    means (3, 11) for causing relative movement between the box (4) provided with the first filter (1) and the piston (10) in order, as the piston and box are being moved closer together, for pressure to be exerted on a volume of a sludge introduced into the filter chamber (8), so that a liquid filtrate flows downwards through the first filter (1) and so that a cake (G) of solid matter remains on the first filter (1), and a scraper device (31) provided for removing this cake when the first filter (1) is placed in its cleaning position, wherein the piston is made in the form of a filter piston (10) so that an effluent passes through the filter piston (10) as the volume of the filter chamber (8) is being decreased and in that a suction pumping means (P) is provided for removing the effluent above the filter piston (10).

* * * * *